United States Patent
Sanvido et al.

(10) Patent No.: US 9,727,485 B1
(45) Date of Patent: Aug. 8, 2017

(54) METADATA REWRITE AND FLATTEN OPTIMIZATION

(71) Applicant: PURE Storage, Inc., Mountain View, CA (US)

(72) Inventors: Marco Sanvido, Belmont, CA (US); Richard Hankins, San Jose, CA (US); Mark McAuliffe, East Palo Alto, CA (US); Neil Vachharajani, San Francisco, CA (US)

(73) Assignee: Pure Storage, Inc., Mountain View, CA (US)

( * ) Notice: Subject to any disclaimer, the term of this patent is extended or adjusted under 35 U.S.C. 154(b) by 317 days.

(21) Appl. No.: 14/552,172

(22) Filed: Nov. 24, 2014

(51) Int. Cl.
*G06F 12/00* (2006.01)
*G06F 12/121* (2016.01)
*G06F 12/02* (2006.01)

(52) U.S. Cl.
CPC .......... *G06F 12/121* (2013.01); *G06F 12/023* (2013.01); *G06F 12/0292* (2013.01)

(58) Field of Classification Search
CPC ..... G06F 12/08; G06F 12/023; G06F 12/0292
USPC ......................................................... 711/159
See application file for complete search history.

(56) References Cited

U.S. PATENT DOCUMENTS

| | | |
|---|---|---|
| 5,208,813 A | 5/1993 | Stallmo |
| 5,403,639 A | 4/1995 | Belsan |
| 5,940,838 A | 8/1999 | Schmuck et al. |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Tamai et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Prasith Thammavong
*Assistant Examiner* — Edmund Kwong
(74) *Attorney, Agent, or Firm* — Edward J. Lenart; Kennedy Lenart Spraggins LLP

(57) ABSTRACT

A system and method for efficiently maintaining metadata stored among a plurality of solid-state storage devices. A data storage subsystem supports multiple mapping tables. Records within a mapping table are arranged in multiple levels. Each level stores at least pairs of a key value and a physical pointer value. The levels are sorted by time. New records are inserted in a created new highest (youngest) level. No edits are performed in-place. A data storage controller determines both a cost of searching a given table exceeds a threshold and an amount of memory used to flatten levels exceeds a threshold. In response, the controller incrementally flattens selected levels within the table based on key ranges. After flattening the records in the selected levels within the key range, the records may be removed from the selected levels. The process repeats with another different key range.

19 Claims, 8 Drawing Sheets

(56) References Cited

U.S. PATENT DOCUMENTS

| | | |
|---|---|---|
| 6,834,298 B1 | 12/2004 | Singer et al. |
| 6,850,938 B1 | 2/2005 | Sadjadi |
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 * | 8/2014 | Colgrove .............. G06F 3/0608 707/639 |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-95/02349 A1 | 1/1995 |
| WO | WO-99/13403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

METADATA REWRITE AND FLATTEN OPTIMIZATION

BACKGROUND OF THE INVENTION

Field of the Invention

This invention relates to computer networks and, more particularly, to efficiently maintaining metadata stored among a plurality of solid-state storage devices.

Description of the Related Art

As computer memory storage and data bandwidth increase, so does the amount and complexity of data that businesses daily manage. A distributed storage system may be coupled to client computers interconnected by one or more networks. If any portion of the distributed storage system has poor performance, company operations may be impaired. A distributed storage system therefore maintains high standards for data availability and high-performance functionality.

Various types of metadata are maintained for the distributed storage system. For example, the metadata may consist of at least mapping tables for storage virtualization that allows access to logical storage without end-users identifying physical storage, mapping tables for deduplication operations, and mapping tables for relating virtual sectors at a specific snapshot level to physical locations. A supported address space may be limited by a storage capacity used to maintain the various mapping tables.

Various software applications provide a means of allocating space on mass-storage arrays. At times, operations are started to reduce the supported metadata. For example, new storage space may be allocated for storing one copy of identical records of mappings or a youngest record of multiple corresponding mappings. The distributed storage system utilizes the records stored in the new allocated storage space. The previous storage space may be retained for an appreciable amount of time for possible error recovery or removed once the new storage space starts being used. However, as the size of the metadata significantly increases, the amount of storage space simultaneously used for the old records of metadata and the new records of metadata may approach address space limits.

In view of the above, systems and methods for efficiently maintaining metadata stored among a plurality of solid-state storage devices are desired.

SUMMARY OF THE INVENTION

Various embodiments of a computer system and methods for efficiently maintaining metadata stored among a plurality of solid-state storage devices are disclosed.

In various embodiments, a data storage subsystem coupled to a network receives read and write requests on the network from a client computer. The data storage subsystem includes multiple data storage locations on multiple storage devices. The data storage subsystem also includes at least one mapping table. The mapping table includes a plurality of entries, with each of the entries including a tuple with a key. The entry may also include a pointer to a physical location within the multiple storage devices. The mapping table is organized as multiple levels, each level storing multiple mapping table entries.

Responsive to receiving a read request, a write request, or other request for an operation to be performed on the multiple storage devices, a data storage controller searches the multiple levels within a respective mapping table. The data storage controller determines a time to search the multiple levels exceeds a threshold. In response, the data storage controller flattens at least two levels of the multiple levels in an incremental manner. In addition, it may have been determined that the amount of memory used during the flattening operation exceeds a respective threshold. In response, the controller incrementally flattens the selected levels based on entries within a key range. When the selected levels have entries flattened within the key range, those particular entries may be removed from the selected levels. A new key range is chosen, and the process repeats.

These and other embodiments will become apparent upon consideration of the following description and accompanying drawings.

Figure 1:
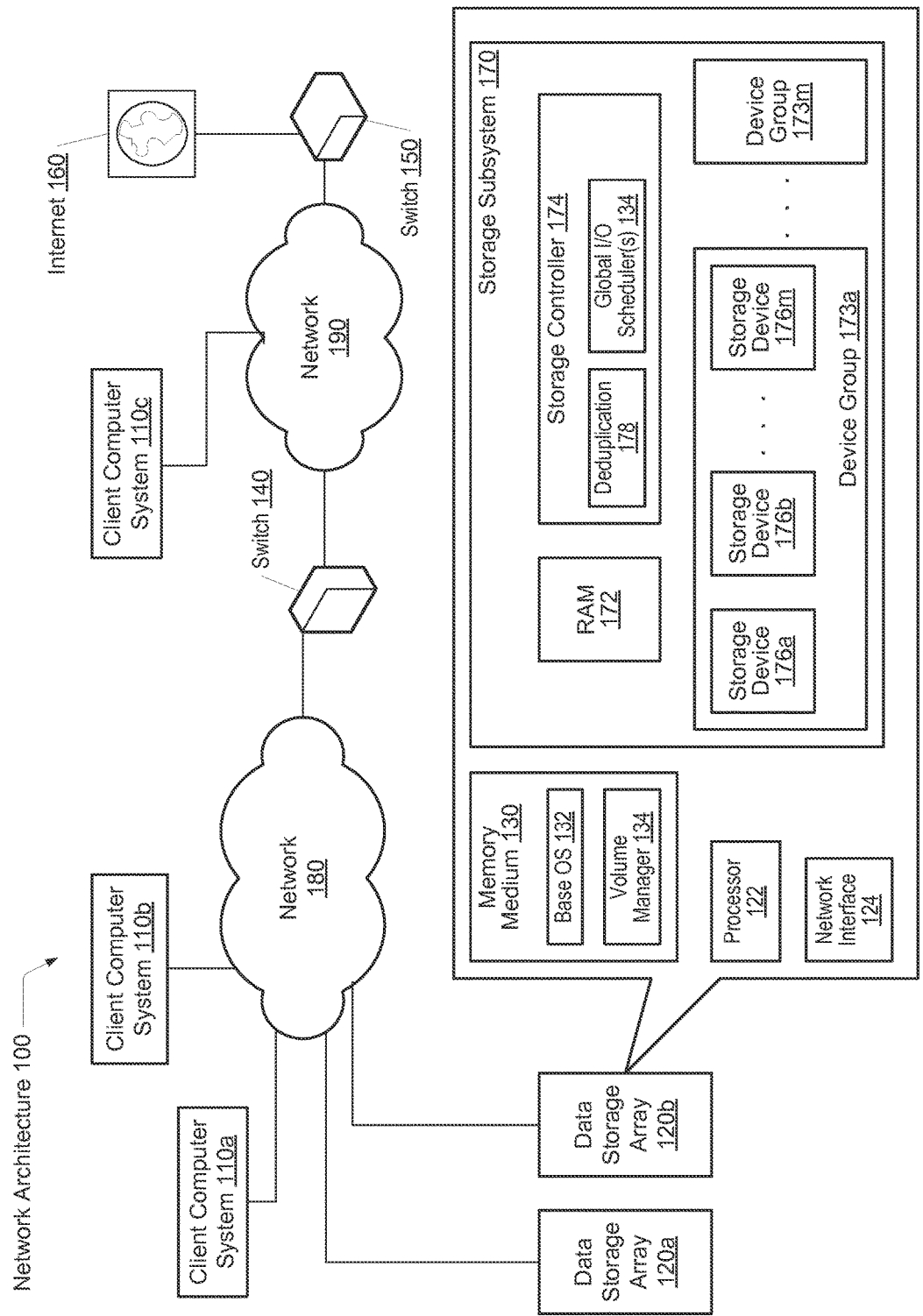
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks).

In some embodiments, each of the storage devices 176a-176m may include or be further coupled to storage consisting of solid-state memory to store persistent data. In one embodiment, the included solid-state memory comprises solid-state drive (SSD) technology. A Solid-State Disk (SSD) may also be referred to as a Solid-State Drive.

Storage array efficiency may be improved by creating a storage virtualization layer between user storage and physical locations within storage devices 176a-176m. In one embodiment, a virtual layer of a volume manager is placed in a device-driver stack of an operating system (OS), rather than within storage devices or in a network. A volume manager or a disk array manager is used to support device groups 173a-173m.

In one embodiment, one or more mapping tables may be stored in a data storage medium. Such a storage medium may comprise volatile memory, non-volatile memory, or a combination of volatile and non-volatile memory. All such embodiments are contemplated. In one embodiment, mapping tables may be stored in the storage devices 176a-176m. The storage devices 176a-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

The information within a mapping table may be compressed. A particular compression algorithm may be chosen to allow identification of individual components, such as a key within a record among multiple records. Therefore, a search for a given key among multiple compressed records may occur. If a match is found, only the matching record may be decompressed. Compressing the tuples within records of a mapping table may further enable fine-grained level mapping.

Network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Each of the client computer systems 110a-110c may include a hypervisor used to support virtual machines (VMs).

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. A random-access memory (RAM) 172 may be used to batch operations, such as received write requests. In various embodiments, when batching write operations (or other operations) non-volatile storage (e.g., NVRAM) may be used.

The base OS 132, the volume manager 134 (or disk array manager 134), any OS drivers (not shown) and other software stored in memory medium 130 may provide functionality providing access to files and the management of these functionalities. The base OS 132 and the OS drivers may comprise program instructions stored on the memory medium 130 and executable by processor 122 to perform one or more memory access operations in storage subsystem 170 that correspond to received requests. Each of the data storage arrays 120a-120b may use a network interface 124 to connect to network 180. Similar to client computer systems 110a-110c, in one embodiment, the functionality of network interface 124 may be included on a network adapter card.

In addition to the above, each of the storage controllers 174 within the data storage arrays 120a-120b may support storage array functions such as snapshots, replication and high availability. In addition, each of the storage controllers 174 may support a virtual machine environment that comprises a plurality of volumes with each volume including a plurality of snapshots. In one example, a storage controller 174 may support hundreds of thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors such as for write requests. A volume ID, a snapshot ID, and a sector number may be used to identify a given volume.

An address translation table may comprise a plurality of entries, wherein each entry holds a virtual-to-physical mapping for a corresponding data component. This mapping table may be used to map logical read/write requests from each of the client computer systems 110a-110c to physical locations in storage devices 176a-176m. A "physical" pointer value may be read from the mapping table during a lookup operation corresponding to a received read/write request. This physical pointer value may then be used to locate a physical location within the storage devices 176a-176m. It is noted the physical pointer value may be used to access another mapping table within a given storage device of the storage devices 176a-176m. Consequently, one or more levels of indirection may exist between the physical pointer value and a target storage location.

Figure 2:
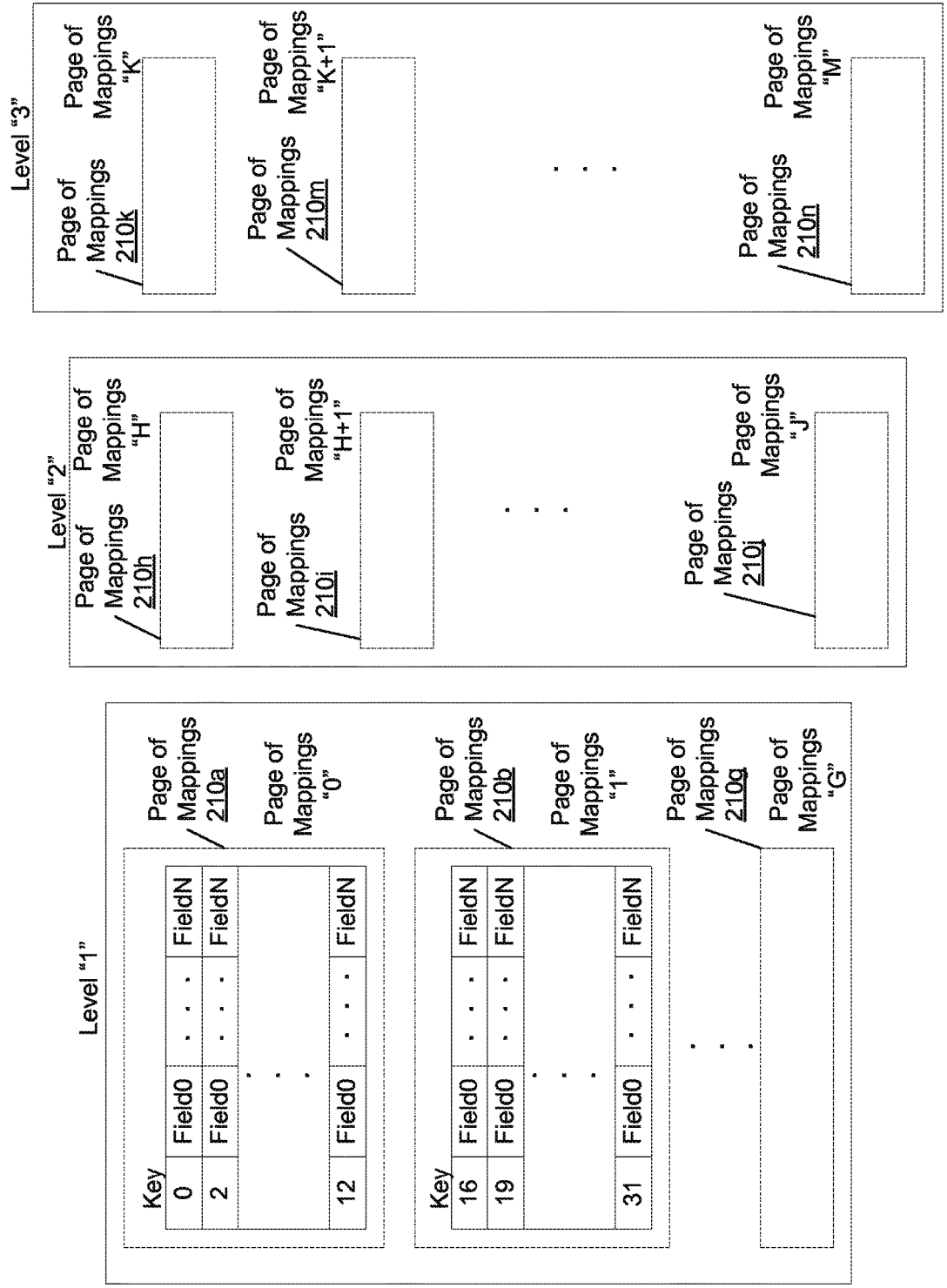
FIG. 2 is a generalized block diagram of one embodiment of a mapping table.

Turning now to FIG. 2, a generalized block diagram of one embodiment of a mapping table is shown. It is noted that while the following discussion describes a mapping table having entries including tuples with at least a key that may be used to identify a location of stored data, other embodiments are possible and are contemplated. More generally, the methods and mechanisms described herein may be used for storing any type of data and for a variety of purposes. Additionally, while a storage controller is generally described as operating upon the table in various ways, it is noted that such a controller may be a specific purpose processor, a general purpose processor, other circuitry, software module(s), or any suitable combination of hardware and/or software. Numerous such embodiments are possible and are contemplated. As discussed earlier, one or more mapping tables may be used for I/O redirection or translation, deduplication of duplicate copies of user data, volume snapshot mappings, and so forth. Mapping tables may be stored in the storage devices 176a-176m. The diagram shown in FIG. 2 represents a logical representation of one embodiment of the organization and storage of the mapping table. Each level shown may include mapping table entries corresponding to a different period of time. For example, level "1" may include information older than information stored in level "2". Similarly, level "2" may include information older than information stored in level "3".

The information stored in the records, pages and levels shown in FIG. 2 may be stored in a random-access manner within the storage devices 176a-176m. Additionally, copies of portions or all of a given mapping table entries may be stored in RAM 172, in buffers within controller 174, in memory medium 130, and in one or more caches within or coupled to processor 122. In various embodiments, a corresponding index may be included in each level for mappings, which are part of the level. Such an index may include an identification of mapping table entries and where they are stored (e.g., an identification of the page) within the level. In other embodiments, the index associated with mapping table entries may be a distinct entity, or entities, which are not logically part of the levels themselves.

Generally speaking, each mapping table comprises a set of rows and columns. A single record may be stored in a mapping table as a row. A record may also be referred to as an entry. In one embodiment, a record stores at least one tuple including a key. Tuples may (or may not) also include data fields including data such as a pointer used to identify or locate data components stored in storage subsystem 170. It is noted that in various embodiments, the storage subsystem may include storage devices (e.g., SSDs), which have internal mapping mechanisms. In such embodiments, the pointer in the tuple may not be an actual physical address per se. Rather, the pointer may be a logical address, which the storage device maps to a physical location within the device. Over time, this internal mapping between logical address and physical location may change. In other embodiments, records in the mapping table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 2. In various embodiments, each column stores information corresponding to a given type. In some embodiments, compression techniques may be utilized for selected fields, which in some cases may result in fields whose compressed representations are zero bits in length.

A key is an entity in a mapping table that may distinguish one row of data from another row. Each row may also be referred to as an entry or a record. A key may be a single column, or it may consist of a group of columns used to identify a record. In some embodiments, a key may correspond to a range of values rather than to a single value. A key corresponding to a range may be represented as a start and end of a range, or as a start and length, or in other ways. The ranges corresponding to keys may overlap with other keys, either ranges or individual values. In one example, an address translation mapping table may utilize a key comprising a volume identifier (ID), a logical or virtual address, a snapshot ID, a sector number, and so forth. A given received read/write storage access request may identify a particular volume, sector and length. A sector may be a logical block of data stored in a volume. Sectors may have different sizes on different volumes. The address translation mapping table may map a volume in sector-size units.

A volume identifier (ID) may be used to access a volume table or a snapshot table that conveys and ID (e.g., a corresponding current snapshot ID). This information along with the received sector number may be used to access the address translation mapping table. Therefore, in such an embodiment, the key value for accessing the address translation mapping table is the combination of the volume ID, snapshot ID, and the received sector number. In one embodiment, the records within the address translation mapping table are sorted by volume ID, followed by the sector number and then by the snapshot ID. This ordering may group together different versions of data components in different snapshots. Therefore, during a lookup for a storage access read request, a corresponding data component may be found with fewer read operations to the storage devices 176a-176m.

The address translation mapping table may convey a physical pointer value that indicates a location within the data storage subsystem 170 storing a data component corresponding to the received data storage access request. The key value may be compared to one or more key values stored in the mapping table. In the illustrated example, simpler key values, such as "0", "2", "12" and so forth, are shown for ease of illustration. The physical pointer value may be stored in one or more of the fields in a corresponding record.

The physical pointer value may include a segment identifier (ID) and a physical address identifying the location of storage. A segment may be a basic unit of allocation in each of the storage devices 176a-176m. A segment may have a redundant array of independent device (RAID) level and a data type. During allocation, a segment may have one or more of the storage devices 176a-176m selected for corresponding storage. The data storage access request may correspond to multiple sectors, which may result in multiple parallel lookups. A write request may be placed in an NVRAM buffer, such as RAM 172, and a write completion acknowledgment may be sent to a corresponding client computer of the client computers 110a-110c. At a later time, an asynchronous process may flush the buffered write requests to the storage devices 176a-176m.

A mapping table may comprise one or more levels as shown in FIG. 2. In FIG. 2, three levels labeled Level "1", Level "2" and Level "N" are shown for ease of illustration. Each level within a mapping table may include one or more partitions. In one embodiment, each partition is a 4 kilo-byte (KB) page. For example, Level "N" is shown to comprise pages 210a-210g, Level "2" comprises pages 210h-210j and Level "1" comprises pages 210k-210n. It is possible and contemplated other partition sizes may also be chosen for each of the levels within a mapping table. In addition, it is possible one or more levels have a single partition, which is the level itself.

In one embodiment, multiple levels within a mapping table are sorted by time. For example, in FIG. 2, Level "1" may be older than Level "2". Similarly, Level "2" may be older than Level "N". In one embodiment, when a condition for inserting one or more new records in the mapping table is detected, a new level may be created. In various embodiments, when a new level is created the number/designation given to the new level is greater than numbers given to levels that preceded the new level in time. For example, if the most recent level created is assigned the value 8, then a newly created level may be assigned the value 9. In this manner a temporal relationship between the levels may be established or determined. As such, the mapping table may be organized in a time ordered manner such that newer levels (i.e., younger levels) are logically placed at a higher position in the mapping tables than older levels. In this manner, the levels may generally be organized according to age. In addition, levels may generally be organized such that they are logically adjacent to other levels that are closest in age.

By creating a new highest level for an insertion of new records, the mapping table is updated by appending the new records. In one embodiment, a single level is created as a new highest level and each of the new records is inserted into the single level. In another embodiment, the new records may be searched for duplicate keys prior to insertion into the mapping table. When a given record storing a duplicate key is found, each of the records buffered ahead of the given record may be inserted into the single level. In some embodiments, the new records may be buffered in a manner to preserve memory ordering, such as in-order completion of requests. Subsequently, another single level may be created and the remainder of the new records may be inserted into this other level unless another record storing a duplicate key is found. If such a record is found, then the steps may be repeated. When a new record is received and a duplicate is found, the duplicate is not edited or overwritten in-place by the insertion of the new records. Rather, updates are performed by appending new records as noted above.

With no edits in-place for the records stored in the mapping table, newer records placed in higher levels may override records storing a same key value located in the lower levels. For example, when the mapping table is accessed by a given key value, one or more levels may be found to store a record holding a key value matching the given key value. In such a case, the highest level of the one or more levels may be chosen to provide the information stored in its corresponding record as a result of the access.

In one embodiment, entries within a given page may be sorted by key. For example, the entries may be sorted in ascending order according to a key included in the entry. Additionally, in various embodiments, the pages within a level may be sorted according to any desired sort order. In various embodiments, the pages within a level may also be sorted (e.g., according to key values or otherwise). In the example of FIG. 2, page 210a of Level N includes records sorted according to key value in ascending order. In various embodiments, one or more columns may be used to store key values. In the example of FIG. 2, two columns or fields are shown in each tuple for storing key values. Utilizing such key values, the records then may be sorted in a desired order. Sorting may be performed based on any of the key values for a record, or any combination of key values for the record. In the example shown, the first record stores a key value including 0 and 8 stored in two columns, and the last record stores a key value including 12 and 33. In this illustrated example, each sorted record in page 210a between the first and the last record stores a key value between 0 and 12 in the first column and the records are arranged in a manner to store key values based (at least in part) on the first column in an ascending order from 0 to 12. Similarly, page 210b includes sorted records, wherein the first record stores key values of 12 and 39 and the last record stores key values of 31 and 19. In this illustrated example, each sorted record in page 210b between the first and the last record stores a key value between 12 and 31 in the first column and the records are arranged in a manner to store key values in an ascending order from 12 to 31.

Figure 3:
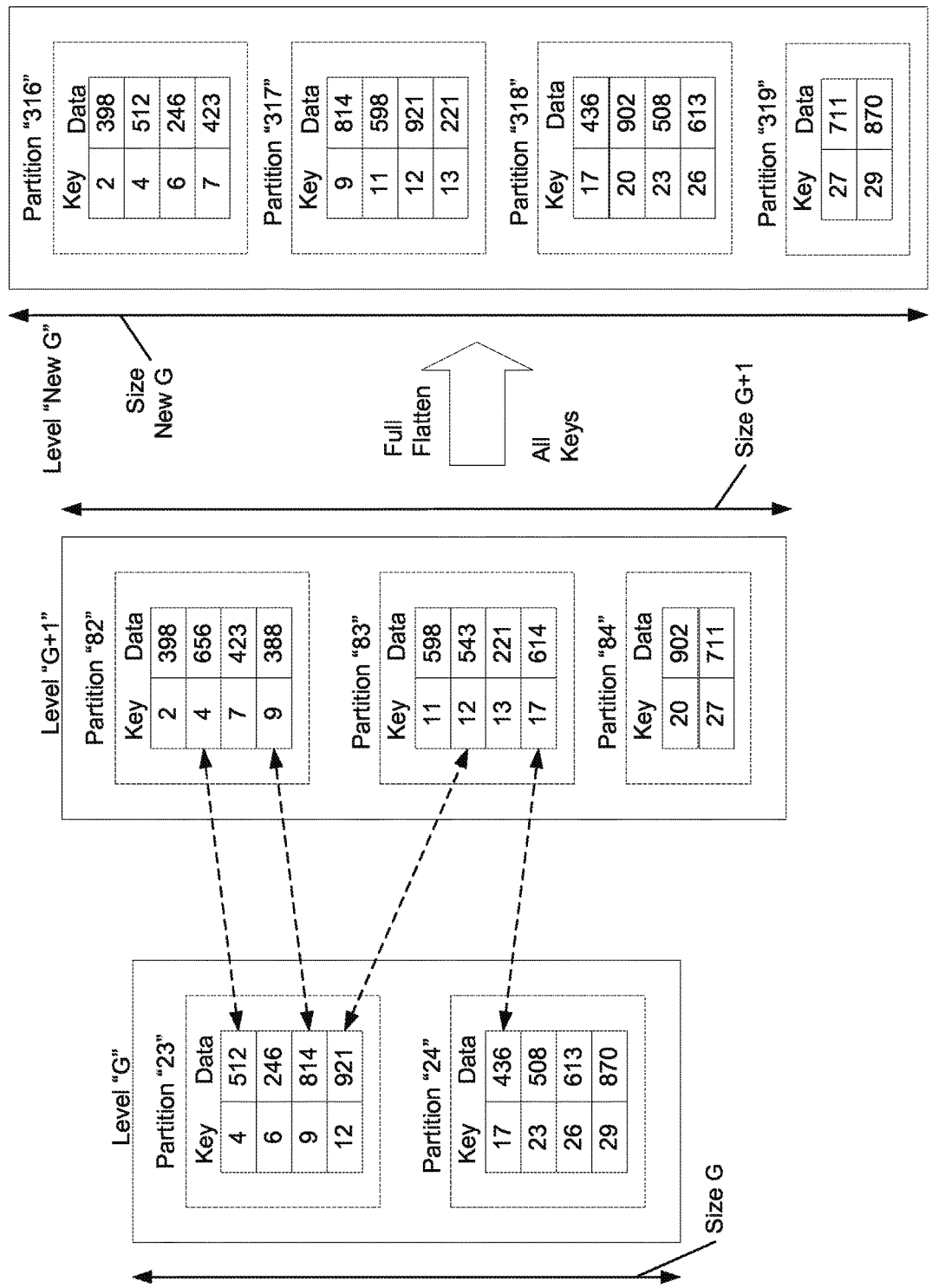
FIG. 3 is a generalized block diagram of one embodiment of a flattening operation for levels within a mapping table.

Turning now to FIG. 3, a generalized block diagram of one embodiment of a flattening operation for levels within a mapping table is shown. Over time as the mapping table grows and accumulates levels due to insertions of new records, the cost (e.g., time and/or other overhead) of searching more levels for a query key value may become larger than desired. In addition, over time the mapping table accumulates keys in older levels that are no longer used. This in turn wastes storage space.

In various embodiments, when the time to search the multiple levels in the mapping table exceeds a threshold, one or more operations may be performed to reduce the number of levels. In one embodiment, the number of levels that must be searched may be reduced by "flattening" one or more existing levels into a single new level. For example, two or more contiguous levels may be chosen for a flattening operation. In such an embodiment, records storing a unique key value within the two or more levels are stored in the new level. Additionally, if two or more records are identified that store a duplicate key value, then only the youngest such record is stored in the new level. The youngest record in such an embodiment corresponds to the latest or most up to date version of the records. In this manner, all records of interest within the two or more levels (during a typical search) will exist in this single new level.

In the above described embodiment, the new single level returns a same result for a search for a given key value as a result provided by the two or more levels it replaces. Since the input and output of data to/from the new single level does not change compared to the two or more levels it replaces, the flattening operation is not synchronized with update operations to the mapping table. No synchronization lock may be used. However, in a node-based cluster, each node may verify it is ready to utilize the new single level and no longer use the two or more levels it replaces prior to the new level becomes the replacement. In one embodiment, the two or more replaced levels may be kept in storage for error recovery purposes.

In the illustrated example in FIG. 3, the records are shown simply as key and pointer pairs. The pages are shown to include four records for ease of illustration. A level "G" and its next contiguous logical neighbor, level "G+1" may be considered for a flattening operation. Level "G" may be younger than Level "G+1". Although two levels are shown to be flattened here, it is possible and contemplated that three or more levels may be chosen for flattening. In the example shown, Level "G+1" may have records storing a same key value found in Level "G". Bidirectional arrows are used to identify the records storing a same key value across the two contiguous levels.

The new Level "New G" includes the duplicate key values found in Level "G" and Level "G+1". In addition, the new Level "New G" includes a pointer value corresponding to the youngest (or younger in this case) record of the records storing the duplicate key value. For example, each of Level "G" and Level "G+1" includes a record storing the key value 4. The younger record is in Level "G" and this record also stores the pointer value 512. Accordingly, the Level "New G" includes a record storing the key value 4 and also the pointer value 512, rather than the pointer value 656 found in the older Level "G+1".

Additionally, the new Level "New G" includes records with unique key values found between Level "G" and Level "G+1". For example, the Level "New G" includes records with the key and pointer pair of 6 and 246 found in Level "G" and the key and pointer pair of 2 and 398 found in Level "G+1". As shown, each of the partitions within the levels is sorted by key value.

Figure 4:
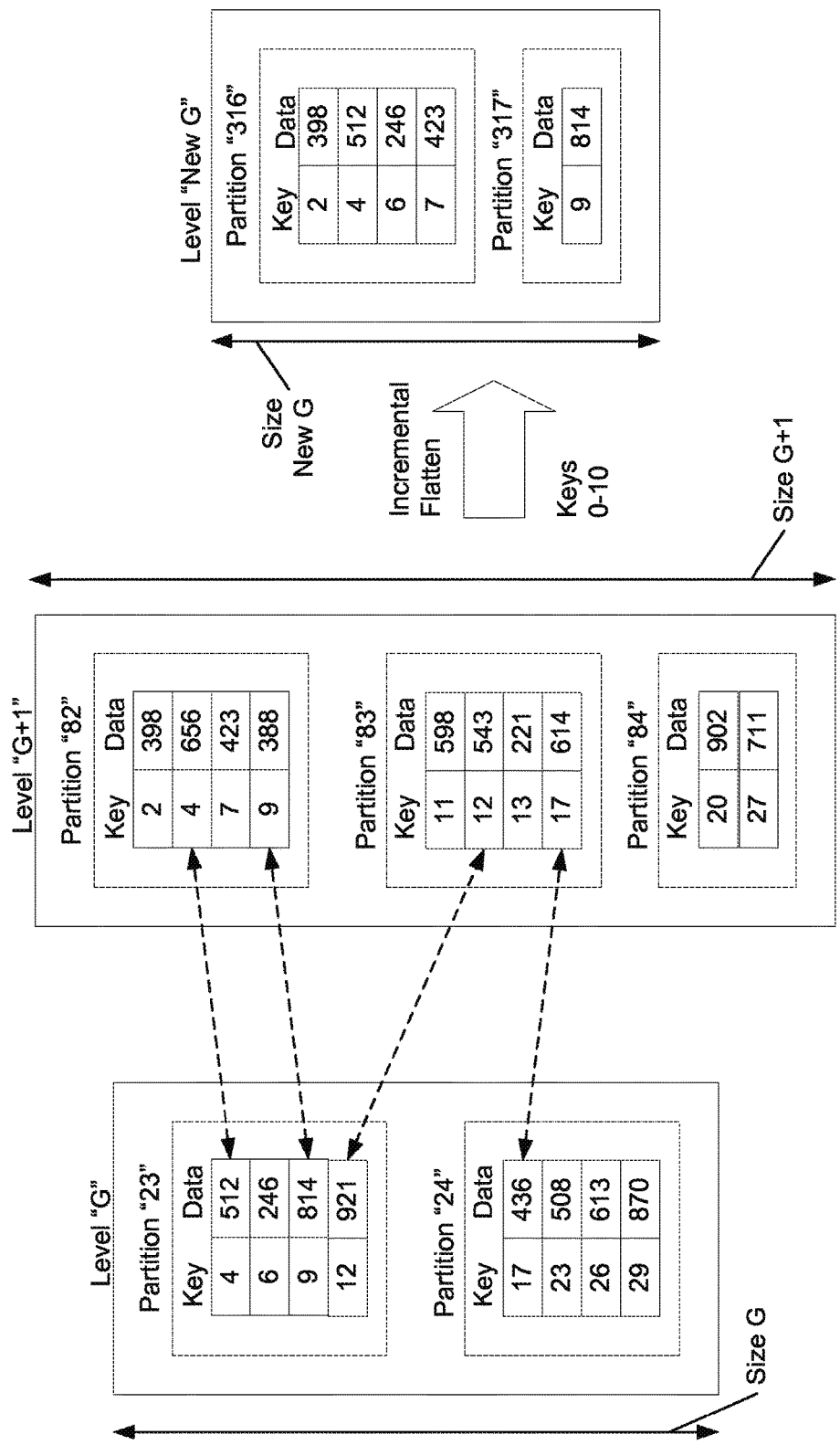
FIG. 4 is a generalized block diagram of one embodiment of an incremental flattening operation for levels within a mapping table.

Referring now to FIG. 4, a generalized block diagram of one embodiment of an incremental flattening operation for levels within a mapping table is shown. Again, the records are shown simply as key and pointer pairs. The pages are shown to include four records for ease of illustration. Level "G" may be younger than Level "G+1". A level "G" and its next contiguous logical neighbor, level "G+1" may be considered for a flattening operation. For example, control logic may have determined the search times for keys in the multiple levels in a mapping table exceeds a threshold. In addition, it may have been determined that the amount of memory used during the flattening operation exceeds a respective threshold.

In the earlier example in FIG. 3, an amount of storage used for the selected levels before the flattening operation includes the Size G and the Size G+1. The amount of additional storage used to store the new level during the flattening operation includes the Size New G. In an extreme case when all records include a unique key, the additional amount of memory used to store the new level during the flattening operation would equal the combined amount of storage used to store the selected levels for flattening. Therefore, if the selected levels for flattening consume 400 giga-bytes (GB) of storage, the new level would consume an additional 400 GB of storage. Consequently, the old and new levels would now consume 800 GB of storage. Although the selected levels could potentially be removed after the flattening operation (e.g., sent to offline archived storage, or otherwise), it may be necessary to allocate 800 GB or more during the flattening operation. This increased pressure on storage space availability may exceed a threshold beyond which performance of the storage system is negatively impacted (e.g., increased latency, reduced redundancy, or otherwise).

In response to determining an amount of memory usage for the selected levels for flattening exceeds a threshold, an incremental flattening operation may be performed. In the example shown, a first key range of 0 to 10 has been selected. A flattening operation is performed within the first key range. The new Level "New G" includes the duplicate key values found in Level "G" and Level "G+1" within the first key range of keys 0 to 10, such as keys 4 and 9.

In addition, the new Level "New G" includes a pointer value corresponding to the youngest (or younger in this case) record of the records storing the duplicate key value. Accordingly, the Level "New G" includes a record storing the key value 4 and also the pointer value 512, rather than the pointer value 656 found in the older Level "G+1". The Level "New G" also includes a record storing the key value 9 and the pointer value 814, rather than the pointer value 388 found in the older Level "G+1".

Additionally, the new Level "New G" includes records with unique key values found between Level "G" and Level "G+1" and within the first key range of 0 to 10. For example, the Level "New G" includes records with the key and pointer pair of 6 and 246 found in Level "G" and the key and pointer pairs of 2 and 398 along with 7 and 423 found in Level "G+1". As shown, each of the partitions within the levels is sorted by key value. The Size New G is about one third the size used in the previous example in FIG. 3.

Figure 5:
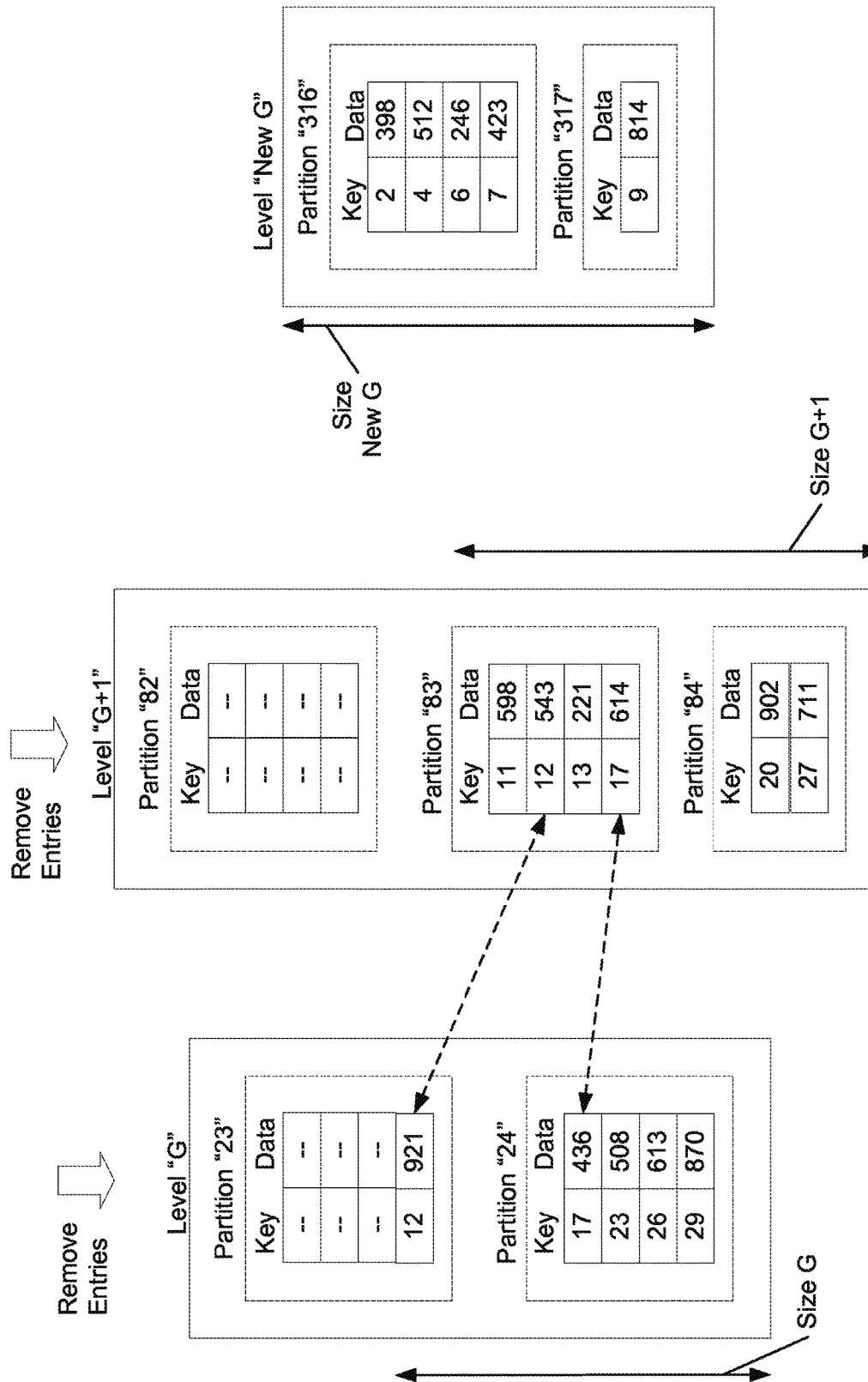
FIG. 5 is a generalized block diagram of another embodiment of an incremental flattening operation for levels within a mapping table.

Turning now to FIG. 5, a generalized block diagram of another embodiment of an incremental flattening operation for levels within a mapping table is shown. Continuing with the example in FIG. 4, here, the records within the first key range are removed from the selected Level "G" and Level "G+1". The records within the first key range are removed from Level "G" and Level "G+1" after records are inserted in the Level "New G". As seen in the example, each of the Size G and the Size G+1 is reduced. Generally speaking, when all entries of a level have been removed the entire level may be completely removed.

Figure 6:
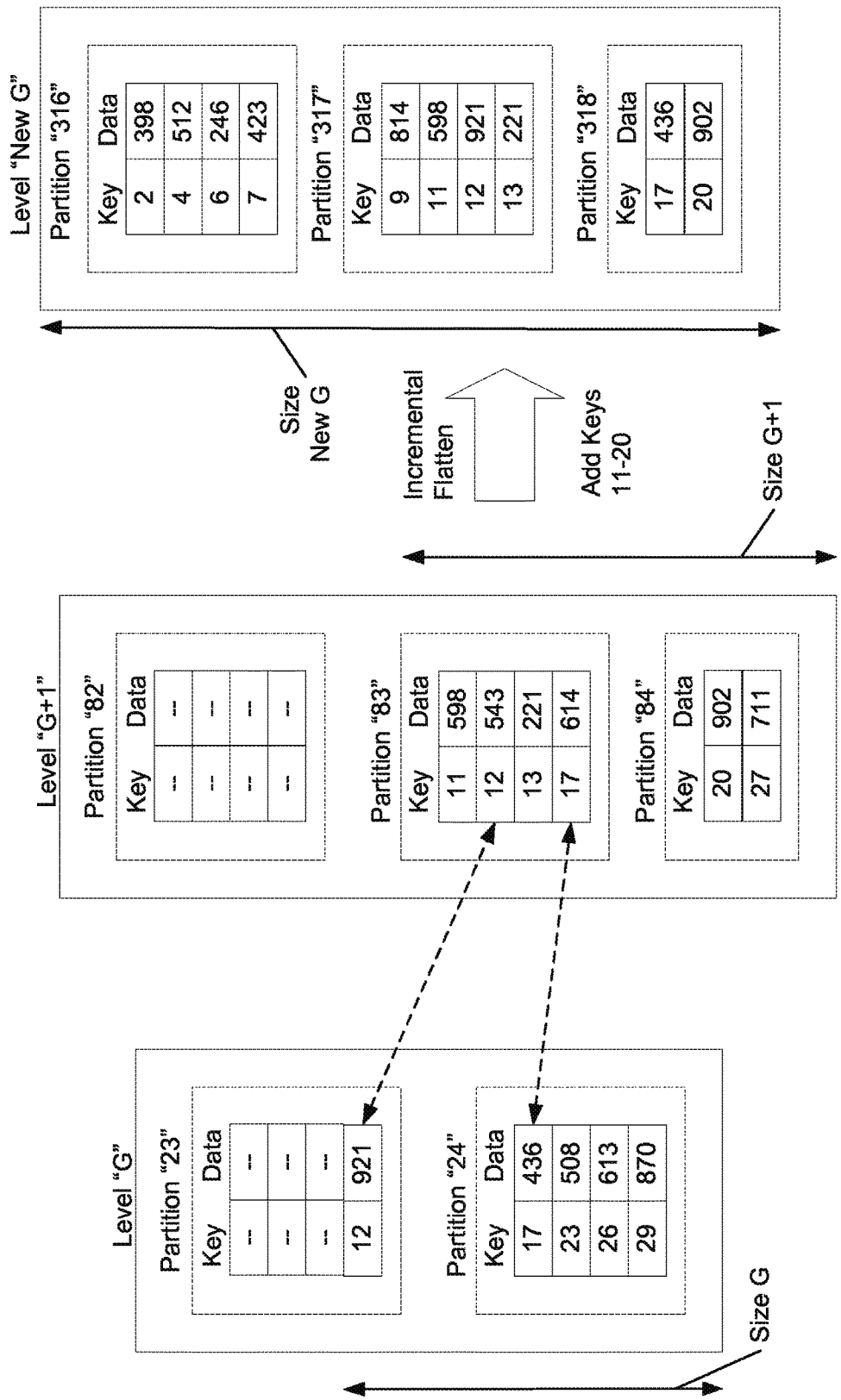
FIG. 6 is a generalized block diagram of yet another embodiment of an incremental flattening operation for levels within a mapping table.

Referring now to FIG. 6, a generalized block diagram of yet another embodiment of an incremental flattening operation for levels within a mapping table is shown. Continuing with the example in FIG. 5, a second key range of 11 to 20 has been selected. A flattening operation is performed within the second key range. The new Level "New G" includes the duplicate key values found in Level "G" and Level "G+1" within the second key range of keys 11 to 20, such as keys 12 and 17.

The Level "New G" includes a record storing the key value 12 and also the pointer value 921, rather than the pointer value 543 found in the older Level "G+1". The Level "New G" also includes a record storing the key value 17 and the pointer value 436, rather than the pointer value 614 found in the older Level "G+1". The new Level "New G" includes records with unique key values found between Level "G" and Level "G+1" and within the second key range of 11 to 20. For example, the Level "New G" includes records with the key and pointer pair of 11 and 598, 13 and 221, and 20 and 902 found in Level "G+1". Although the Size New G increases, both sizes of Level "G" and Level "G+1" remain reduced. Therefore, the amount of memory being used for the incremental flattening may be significantly reduced.

Figure 7:
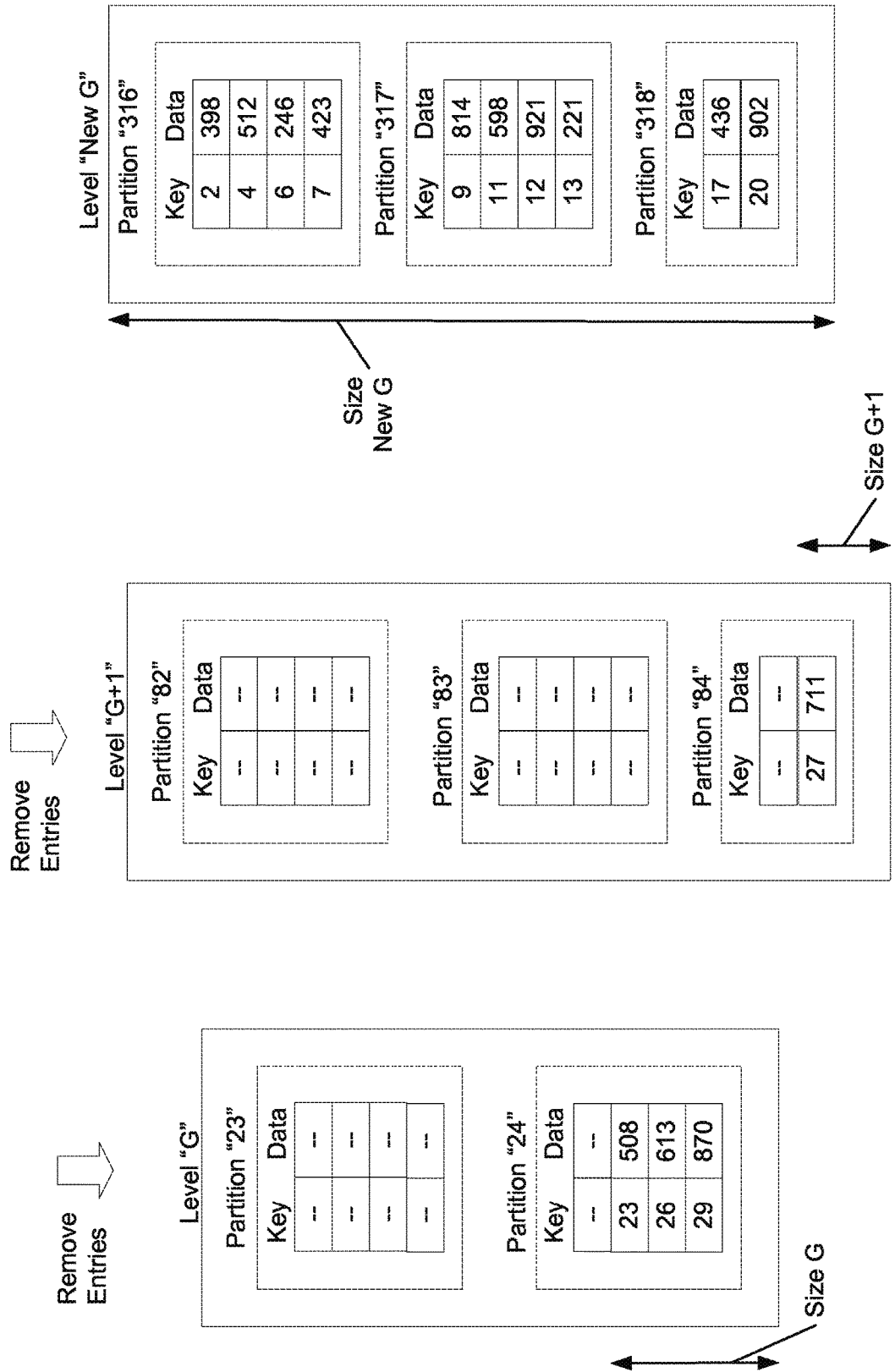
FIG. 7 is a generalized block diagram of yet another embodiment of an incremental flattening operation for levels within a mapping table.

Referring now to FIG. 7, a generalized block diagram of yet another embodiment of an incremental flattening operation for levels within a mapping table is shown. Continuing with the example in FIG. 6, here, the records within the second key range are removed from the selected Level "G" and Level "G+1". The records within the second key range are removed from Level "G" and Level "G+1" after records are inserted in the Level "New G". As seen in the example, each of the Size G and the Size G+1 is reduced.

Figure 8:
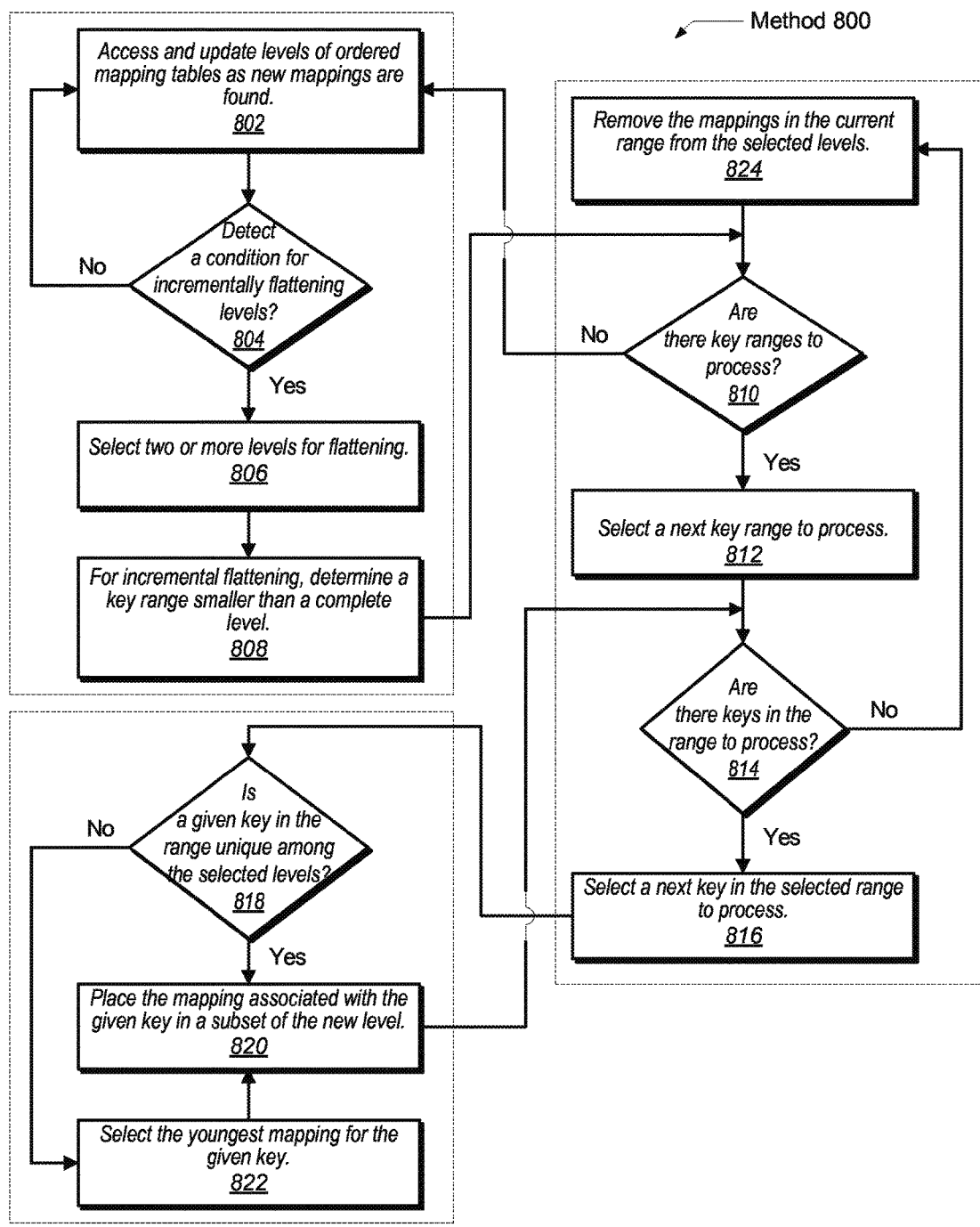
FIG. 8 is a generalized flow diagram illustrating one embodiment of a method for incrementally flattening levels within a mapping table.

Turning now to FIG. 8, one embodiment of a method 800 for incrementally flattening levels within a mapping table is shown. The components embodied in the network architecture 100 and the mapping table in FIG. 2 described above may generally operate in accordance with method 800. For purposes of discussion, the steps in this embodiment are shown in sequential order. However, some steps may occur in a different order than shown, some steps may be performed concurrently, some steps may be combined with other steps, and some steps may be absent in another embodiment.

Storage space is allocated for a mapping table and corresponding indexes. In block 802, the mapping table and indexes are accessed during operations in a storage subsystem. The mapping table and indexes are updated over time. New levels are added to the mapping table over time. The search time for a key within the levels may exceed a threshold. Alternatively, a number of levels built in the mapping table may exceed a threshold. An amount of memory used to store the levels of the mapping table may exceed a threshold. Cost of searching the levels within the mapping table may also include time to perform a corresponding operation, an occupation of one or more buses, storage space used during a corresponding operation, and so forth. In addition, a count of a number of records within each level may be used to estimate when an incremental flattening operation is performed. If a condition for incrementally flattening levels is satisfied (conditional block 804), then in block 806, two or more levels are selected for incremental flattening. Although the lowest levels, or the oldest levels, may be the best candidates for flattening, a younger group may also be selected.

For incremental flattening, in block 808, a key range representing less than a complete level is identified. In various embodiments, a level may include a start key value and an end key value indicating a range of key values represented within the given level. In order to process or flatten less than an entire level, a subset of a range of key values (or "subrange") corresponding to a given level may be identified. Entries in the levels corresponding to keys within the subset are then processed during the incremental flattening operation. Selection of a particular subrange may be determined in a variety of ways. For example, the number of keys within a key range may be used to determine a subset of entries to process. For example, if there are a relatively large number of entries within a given key range, then the subrange that is selected may be smaller than if the number of entries within the given key range is relatively small (i.e., a wider range is used for sparsely populated ranges and a narrower range for more densely populated ranges). In this manner, the number of entries processed may controlled. In some embodiments, the number of keys within a given key range may identified by a value stored in a configuration or status register, as part of an entry in a level, or otherwise. In other embodiments, the number of keys in the key range may be determined or estimated from the sizes of the selected levels. Numerous such embodiments are possible and are contemplated.

The key range may be a particular fraction of the total number of records stored in the selected levels, wherein the fraction is stored in a configuration or status register. Alternatively, the key range may be computed based on ranges of the number of records in the selected levels. In some embodiments, the size of the key range is the same during each iteration of the incremental flattening. In other embodiments, the sizes of the key ranges may differ in one or more iterations from other key range sizes used in other iterations.

If the incremental flattening hasn't finished and there are key ranges to process (conditional block 810), then in block 812, a next key range to process is selected. The start key value, the end key value, and the size of the key range to process may use one of the previously described methods. If the current iteration of the incremental flattening hasn't finished and there are keys to process in the key range (conditional block 814), then in block 816, a next key in the current key range is selected to process.

If the next key in the key range is unique among the selected levels (conditional block 818), then in block 820, the mapping associated with the given key (next key) is inserted in a subset of the new level. If the next key in the key range is not unique among the selected levels (conditional block 818), then in block 822, the youngest mapping for the given key (next key) is selected. In block 820, the selected youngest mapping associated with the given key (next key) is inserted in the subset of the new level. Following, control flow of method 800 moves to conditional block 814.

If the current iteration of the incremental flattening has finished and there are no more keys to process in the current key range (conditional block 814), then in block 824, the mappings in the current key range in the selected levels may be removed. Memory usage during the incremental flattening may be reduced by removing these records from the selected levels. For each key range, a new range is produced in a new single level. In the earlier example, the new single Level "New G" includes the youngest records and the unique records among the Level "G" and the Level "G+1" one key range at a time.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A node-based storage cluster, the node-based storage cluster configured to:
    detect a condition for flattening two or more levels within a mapping table that includes a plurality of levels, wherein each level includes one or more entries and each entry within a level is associated with a key that is unique from all other entries in the level; and
    responsive to detecting the condition:
        select two or more levels for flattening;
        create a new level to be added to the mapping table;
        insert, within the new level, each entry in the two or more levels whose key does not match the key of any other entry in the two or more levels;
        insert, within the new level, each valid entry in the two or more levels whose key does match the key of another entry in the two or more levels;
        receive, from each node in the node-based storage cluster, verification that the node is ready to utilize the new level; and
        remove, from the node-based storage cluster, the two or more levels for flattening, including archiving the two or more levels for flattening in offline storage.

2. The node-based storage cluster as recited in claim 1, wherein the plurality of levels are organized based on temporal relationships between the levels.

3. The node-based storage cluster as recited in claim 1, wherein the entry in the two or more levels whose key does match the key of another entry in the two or more levels is valid if the entry is included within a more recent level than any other entries in the two or more levels that are associated with the same key.

4. The node-based storage cluster as recited in claim 1, wherein the entry in the two or more levels whose key does match the key of another entry in the two or more levels is invalid if the entry is included within a less recent level than any other entries in the two or more levels that are associated with the same key.

5. The node-based storage cluster as recited in claim 1, wherein the node-based storage cluster is further configured to select the two or more levels based at least in part on an age of the two or more levels relative to other levels in the mapping table.

6. The node-based storage cluster as recited in claim 1, wherein the condition for flattening the two or more levels comprises an amount of memory used to store the plurality of levels exceeds a threshold.

7. The node-based storage cluster as recited in claim 1, wherein the condition for flattening the two or more levels comprises a time to search for a given key in the plurality of levels exceeds a threshold.

8. A method for use in a storage system, the method comprising:
    detecting a condition for flattening two or more levels within a mapping table that includes a plurality of levels, wherein each level includes one or more entries and each entry within a level is associated with a key that is unique from all other entries in the level; and
    responsive to detecting the condition:
        selecting two or more levels for flattening;
        creating a new level to be added to the mapping table;
        inserting, within the new level, each entry in the two or more levels whose key does not match the key of any other entry in the two or more levels;
        inserting, within the new level, each valid entry in the two or more levels whose key does match the key of another entry in the two or more levels; and
        removing the two or more levels for flattening, including archiving the two or more levels for flattening in offline storage.

9. The method as recited in claim 8, wherein the plurality of levels are organized based on temporal relationships between the levels.

10. The method as recited in claim 8, wherein the entry in the two or more levels whose key does match the key of another entry in the two or more levels is valid if the entry is included within a more recent level than any other entries in the two or more levels that are associated with the same key.

11. The method as recited in claim 8, wherein the entry in the two or more levels whose key does match the key of another entry in the two or more levels is invalid if the entry is included within a less recent level than any other entries in the two or more levels that are associated with the same key.

12. The method as recited in claim 8, further comprising selecting the two or more levels based at least in part on an age of the two or more levels relative to other levels in the mapping table.

13. The method as recited in claim 8, wherein the condition for flattening the two or more levels comprises an amount of memory used to store the plurality of levels exceeds a threshold.

14. The method as recited in claim 8, wherein each of the one or more entries is associated with a key value and entries within a level are sorted by key value.

15. The method as recited in claim 8, wherein the condition for flattening the two or more levels comprises a time to search for a given key in the plurality of levels exceeds a threshold.

16. A non-transitory computer readable storage medium storing program instruction executable by a processor to:
    detect a condition for flattening two or more levels within a mapping table that includes a plurality of levels, wherein each level includes one or more entries and each entry within a level is associated with a key that is unique from all other entries in the level; and responsive to detecting the condition:
   select two or more levels for flattening;
   create a new level to be added to the mapping table;
   insert, within the new level, each entry in the two or more levels whose key does not match the key of any other entry in the two or more levels; and
   insert, within the new level, each valid entry in the two or more levels whose key does match the key of another entry in the two or more levels
   remove the two or more levels for flattening, including archiving the two or more levels for flattening in offline storage.

17. The computer readable storage medium as recited in claim 16, wherein the plurality of levels are organized based on temporal relationships between the levels.

18. The computer readable storage medium as recited in claim 16, wherein the entry in the two or more levels whose key does match the key of another entry in the two or more levels is valid if the entry is included within a more recent level than any other entries in the two or more levels that are associated with the same key.

19. The computer readable storage medium as recited in claim 16, wherein the entry in the two or more levels whose key does match the key of another entry in the two or more levels is invalid if the entry is included within a less recent level than any other entries in the two or more levels that are associated with the same key.

* * * * *